United States Patent [19]

Kim

[11] Patent Number: 5,315,576
[45] Date of Patent: May 24, 1994

[54] OPTICAL PICK-UP DEVICE FOR OPTICAL DISC PLAYER

[75] Inventor: Young S. Kim, Seoul, Rep. of Korea

[73] Assignee: Goldstar Co., Ltd., Rep. of Korea

[21] Appl. No.: 931,683

[22] Filed: Aug. 18, 1992

[30] Foreign Application Priority Data

Aug. 20, 1991 [KR] Rep. of Korea ............... 14349/1991

[51] Int. Cl.$^5$ .............................................. G11B 7/09
[52] U.S. Cl. ................................. 369/112; 369/44.26; 369/100
[58] Field of Search ............ 369/122, 112, 100, 44.37, 369/44.38, 44.26

[56] References Cited

U.S. PATENT DOCUMENTS

| | | | |
|---|---|---|---|
| 4,888,757 | 12/1989 | Fujita | 369/122 |
| 4,999,826 | 3/1991 | Fujita | 369/44.41 |
| 5,043,965 | 8/1991 | Iida et al. | 369/116 |
| 5,068,845 | 11/1991 | Yagi | 369/112 |
| 5,128,693 | 7/1992 | Tatemichi et al. | 346/108 |
| 5,157,650 | 10/1992 | Ozue et al. | 369/111 |

Primary Examiner—Paul M. Dzierzynski
Assistant Examiner—Drew A. Dunn
Attorney, Agent, or Firm—Ostrolenk, Faber, Gerb & Soffen

[57] ABSTRACT

An optical pick-up device of an optical disc player comprsing a laser source part for generating a laser beam and for scanning the laser beam as a beam spot having a predetermined size, a beam deflecting part for receiving the laser beam scanned by the laser source part and for deflecting the laser beam so as to cause the laser beam to be scanned to a desired access position of an optical disc. The beam deflecting part utilizes an acoustooptic deflector and an acoustooptic deflector control member for controlling the ultrasonic frequency, in response to a feedback signal, which in turn corresponds to the desired access position of the optical disc. Further, a beam scanning part for causing the laser beam scanned by the beam deflecting part to become a minute beam spot, which is in turn scanned to the optical disc on the turntable, and for separating the retrace laser beam reflected by the optical disc by reflecting the retrace laser beam, and an optical detector for receiving the laser beam, which has been reflected by the optical disc and separated and reflected by the beam scanning part, and for detecting the laser beam so as to output electric signals corresponding to the detected laser beam. The optical pick-up device does not require a conventional servo mechanism, thereby accomplishing the compactness of the construction, permitting the tracking accuracy to be improved irrespective of the outside vibration and reducing the access time.

5 Claims, 4 Drawing Sheets

OPTICAL PICK-UP DEVICE FOR OPTICAL DISC PLAYER

BACKGROUND OF THE INVENTION

1. Field of the Invention

The present invention relates in general to an optical pick-up device of optical disc players such as a laser disc player (LDP), a compact video disc player (CVDP), a compact disc player (CDP) and etc., and more particularly to an optical pick-up device which does not require a servo mechanism for carrying out the mechanical movement of an optical pick-up head but comprises an acoustooptic deflector for scanning the laser beam to the optical disc simultaneously with deflecting the laser beam to a desired direction.

2. Description of the Prior Art

With reference to FIGS. 1 and 2 showing a known optical pick-up device of an optical disc player, the known device generally comprises an optical pick-up head part 10 for recording/playing back the data on/from an optical disc 1. This known device is also provided with a servo mechanism for controlling the precise movement of the optical pick-up head part 10 with respect to the optical disc and the data recording/playing back operation of the part 10.

As shown in FIG. 2, the optical pick-up head part 10 comprises a laser source, that is, a laser diode 11 for generating a laser beam, a collimator 12 for collimating the laser beam from the laser diode 11 so as to make this beam become a parallel beam. Under the collimator 12, a beam separator 13 and an objective lens 14 are sequentially arranged as spaced apart from the separator 13 and also from each other. Here, the beam separator 13 receives two types of incident laser beams, the one being received from the collimator 12 and the other being reflected by the optical disc 1, and causes the one laser beam to be scanned to the optical disc 1 while it reflects the other laser beam in order to separate the laser beam. On the other hand, the objective lens 14 receives the laser beam from the beam separator 13 and focuses this laser beam on the optical disc 1. When the laser beam is focused on the optical disc 1 by the objective lens 14, this laser beam has the shape of a minute beam spot. If the laser beam reaches a desired position of the optical disc 1, it is reflected by the disc 1. At this time, the objective lens 14 receives such a laser beam reflected by the disc 1 so as to make this beam become a parallel beam which is in turn received by the beam separator 13. In addition, the pick-up head part 10 includes a condenser lens 15 for condensing the laser beam which has been reflected and separated by the separator 13. An optical detector 16 is provided so as to detect the condensed beam from the condenser lens 15 in order to output an electric signal corresponding to the detected laser beam.

On the other hand, the servo mechanism of the known device comprises a guide rail 21 for guiding the movement of the pick-head part 10 so as to cause this part 10 to be located at a desired position above the optical disc 1. At an end of the guide rail 21, a step motor 22 for controlling the movement of the pick-up head part 10 along the rail 21 is disposed. In addition, this servo mechanism is provided with a servo circuit 23 for controlling the operations of both the step motor 22 and the pick-up head part 10.

In operation of the above optical pick-up device, the laser diode 11 of the optical pick-up head part 10 generates a laser beam which is in turn received by the collimator 12 in order to be collimated thereby. This collimated laser beam is then received by the beam separator 13 and in turn focused on the optical disc 1 by means of the objective lens 14. When the laser beam is focused on the disc 1, this beam becomes a minute beam spot by addition of the objective lens 14.

Upon being focused on the disc 1, the laser beam is reflected by the disc 1 and received by the beam separator 13 by way of the objective lens 14. By this beam separator 13, the received laser beam is reflected in order to be condensed by the condenser lens 15. This condensed beam is then received by the optical detector 16 which detects the laser beam and outputs electric signals proportional to the intensity of the laser beam reflected by the disc 1, thereby causing the data recorded on the disc 1 to be detected.

On the other hand, in order to permit the optical pick-up head part 10 to record and to play back the data on and from the optical disc 1 using the laser beam, it is required to precisely control the movement of the optical pick-up head part 10 by means of the servo mechanism.

In other words, the servo circuit 23 controls the step motor 22 in order to drive the optical pick-up head part 10 to move to a desired position above the optical disc 1 as guided by the guide rail 21. Here, each track of the disc 1 conventionally has a minute width of a few micrometers. Hence, in order to accurately locate the optical pick-up head part 10 above a predetermined track of the disc 1 which is intended to be accessed by the head part 10, the movement operation of optical pick-up head part 10 is necessarily precisely controlled in consideration of mechanical inertia caused by the movement of the head part 10 and the like.

The known optical pick-up device of the optical disc player thus requires to be equipped with a precise servo mechanism which can make possible to precisely control the movement of the optical pick-up head part 10 within a minute range of a few micrometers. Furthermore, this known optical pick-up device requires a high level of circuit technique for improving the accuracy of its operation. In addition, there is the inevitable limitation in reducing the access time due to the mechanical movement of the optical pick-up head part 10.

Also, in order to accomplish the precise location of the pick-up head part 10 with respect to the optical disc 1, the servo mechanism must be precisely operated so that it inevitably has a disadvantage in that it has no resistance to a mechanical shock such as an outer vibration. Particularly, in such a servo mechanism, the guide rail 21 must be machined so as to have a high machining accuracy and this causes the manufacturing cost to be unwillingly increased.

SUMMARY OF THE INVENTION

It is, therefore, an object of the present invention to provide an optical pick-up device of an optical disc player in which the above disadvantages can be overcome and which uses an acoustooptic deflector for accessing the optical disc instead of the aforementioned conventional servo mechanism, thereby providing desirable light weight and compactness for the optical pick-up device, having a good resistance to a mechanical shock such as outside vibration and substantially reducing the access time.

The above-mentioned object of this invention can be accomplished by providing an optical pick-up device of an optical disc player comprising: a laser source part for generating a laser beam and for scanning the laser beam as a beam spot having a predetermined size, the laser source part being disposed above a disc turntable, the turntable being rotatably mounted on a deck of the optical disc player, so as to be spaced apart from the turntable by a predetermined distance; a beam deflecting part for receiving the laser beam scanned by the laser source part and for deflecting the laser beam so as to cause the laser beam to be scanned to a desired access position of an optical disc; a beam scanning part for causing the laser beam scanned by the beam deflecting part to become a minute beam spot which is in turn scanned to the optical disc on the turntable, the beam scanning part also functioning to separate the retrace laser beam reflected by the optical disc by reflecting the retrace laser beam; and an optical detector for receiving the laser beam, which has been reflected by the optical disc, separated and reflected by the beam scanning part, and for detecting the laser beam so as to output electric signals corresponding to the detected laser beam.

Here, the laser source part comprises a semiconductor laser source for radiating the laser beam toward the upper surface of the optical disc; and a collimator for collimating the laser beam radiated from the laser source in order to cause the laser beam to become the laser beam spot having the predetermined size which is in turn scanned to the beam deflecting part.

The beam deflecting part comprises an acoustooptic deflector for deflecting the laser beam of the laser source part in accordance with the change of the ultrasonic frequency thereof, the deflector being disposed below the laser source part; and an acoustooptic deflector control member for controlling the ultrasonic frequency of the acoustooptic deflector in response to an inputted feedback signal, the feedback signal corresponding to the desired access position of the optical disc and being outputted from the optical deflector, in order to cause the laser beam to be accurately scanned to the desired access position of the optical disc which is intended to be accessed, the control member being disposed at a side of the acoustooptic deflector as electrically connected thereto by means of a signal cable.

Also, the beam scanning part comprises a free objective lens for causing the laser beam scanned by the beam deflecting part to become a minute beam spot, which is in turn focused on the desired access position of the optical disc, and for condensing the retrace laser beam reflected by the optical disc, the free objective lens being disposed between the beam deflecting part and the optical disc; a beam separtor for transmitting the laser beam, which has been deflected by the beam deflecting part, in order to cause the laser beam to be received by the free objective lens and for reflecting the retrace laser beam, which has been reflected by the optical disc and retraced through the free objective lens, at a predetermined angle in order to separate the retrace laser beam, the beam separator being disposed between the free objective lens and the beam deflecting part; and a condenser lens for condensing the retrace laser beam, which has been reflected by the beam separator, and for causing the condensed laser beam to be received by the optical detector.

In operation of such an optical pick-up device of this invention, the semiconductor laser source of the laser source part generates a laser beam which is in turn collimated by the collimator and received by the acoustooptic deflector of the beam deflecting part. Here, this acoustooptic deflector is controlled in its ultrasonic frequency under the control of the acoustooptic deflector control member and this causes the deflection angle of the laser beam to be controlled in accordance with the change of the ultrasonic frequency. The laser beam, which has been deflected by the acoustooptic deflector to a desired deflecting direction, then becomes a beam spot of a predetermined minute size by addition of the beam scanning part and is in turn scanned to the optical disc. When the laser beam reaches the optical disc, this laser beam is reflected by the optical disc so as to be received as a retrace laser beam by the optical detector by way of the beam scanning part. At the optical detector, the retrace laser beam is detected. In result, the optical detector generates an electric signal corresponding to the detected laser beam. This electric signal is then applied to a signal processing circuit so as to be processed thereby. At this time, the acoustooptic deflector control member is applied with a feedback signal outputted from the optical detector and changes the ultrasonic frequency of the acoustooptic deflector in response to the received feedback signal, thereby causing the deflection angle of the laser beam to be changed to a desired direction. In this regard, the optical pick-up device of this invention can carry out the orbit tracking of the optical disc without addition of mechanical movement.

BRIEF DESCRIPTION OF THE DRAWINGS

The above and other objects, features and other advantages of the present invention will be more clearly understood from the following detailed description taken in conjunction with the accompanying drawings, in which:

FIGS. 5A and 5B are views showing a construction and an operation of an acoustooptic deflector of the optical pick-up device of FIG. 3, respectively, in which FIG. 5A shows that an acoustooptic material is horizontally oriented and the laser beam is deflected at a predetermined angle by the material; and FIG. 5B shows that the acoustooptic material is inclinedly oriented due to the phase differences between the ultrasonic transducers and the deflection angle of the laser beam is changed from that of the FIG. 5A due to such an inclined orientation of the material.

DESCRIPTION OF THE PREFERRED EMBODIMENTS

Figure 1:
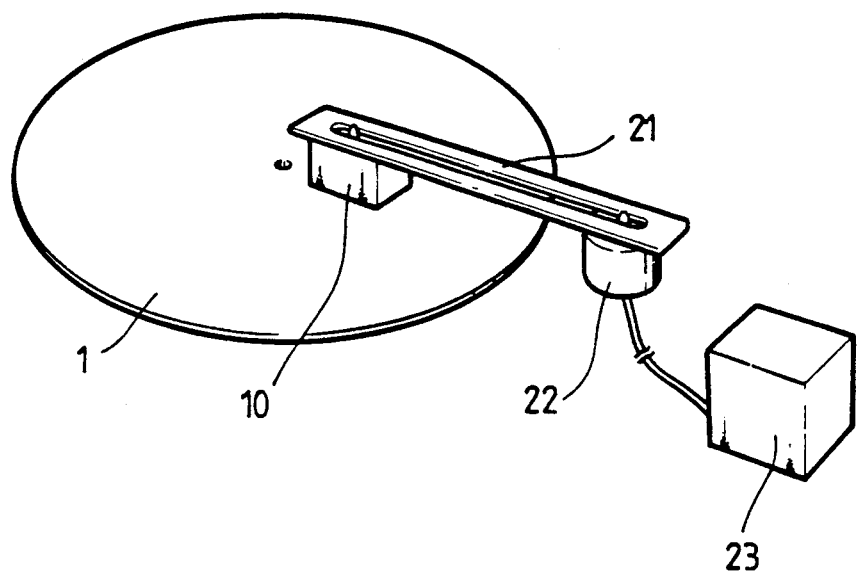
FIG. 1 is a schematic perspective view of an embodiment of a known optical pick-up device of an optical disc player.
Figure 2:
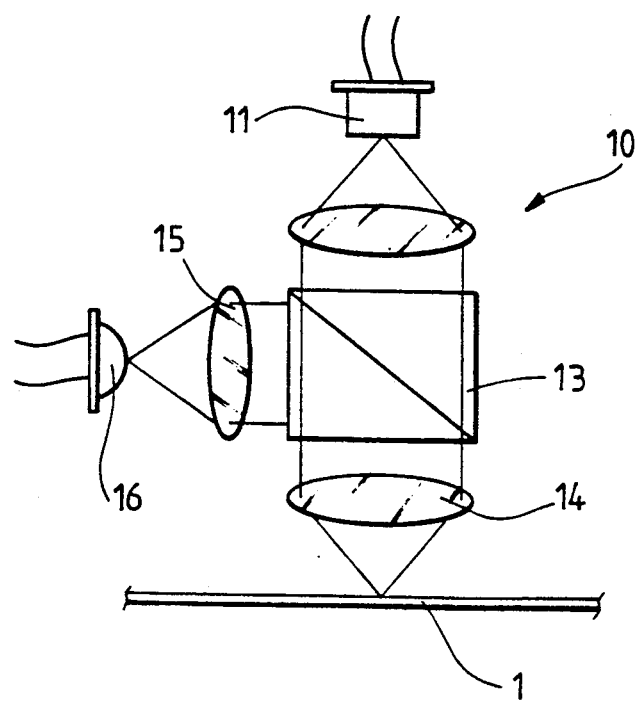
FIG. 2 is a schematic view showing a general construction of an optical pick-up head part of the known optical pick-up device.
Figure 3:
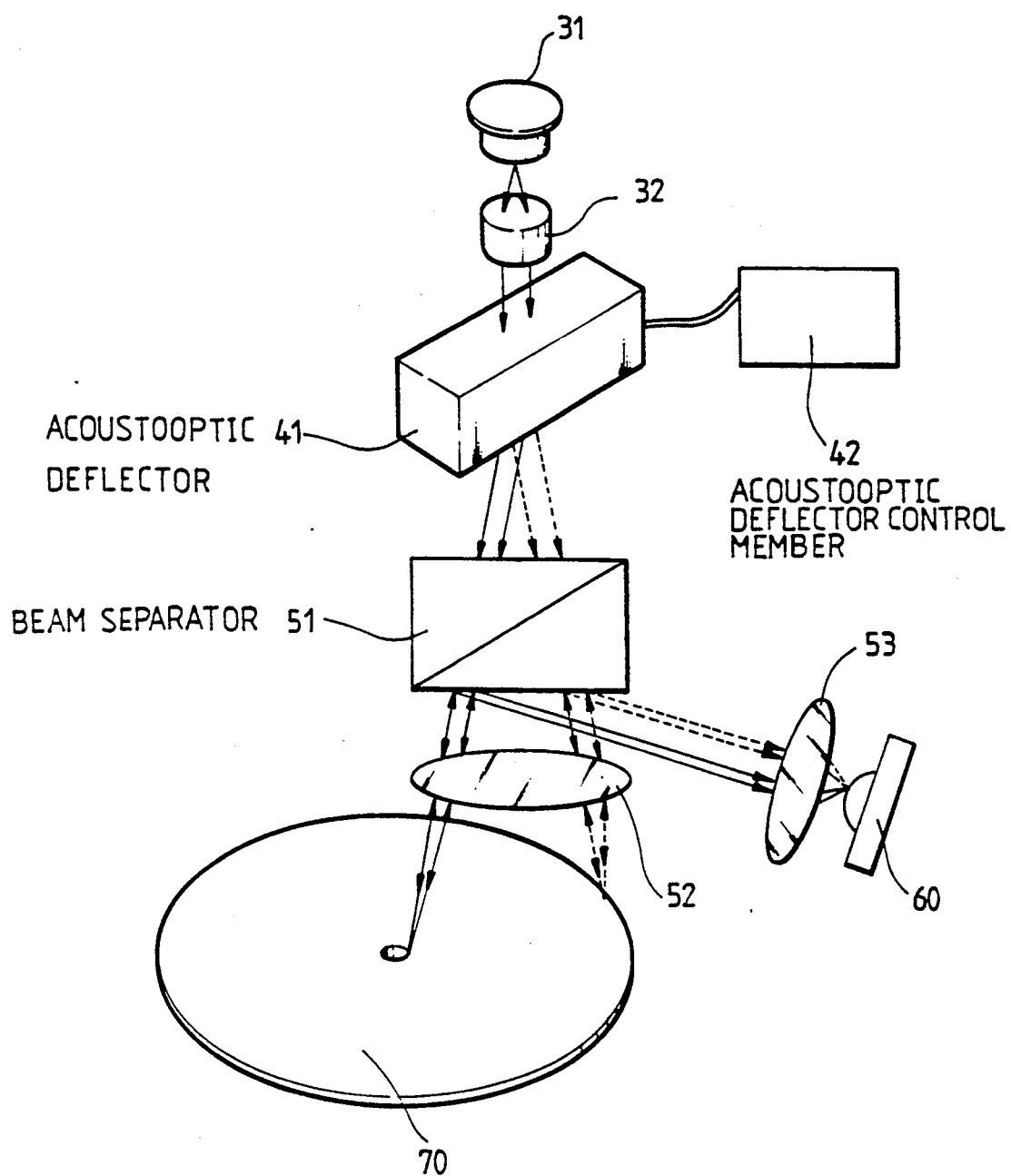
FIG. 3 is a schematic perspective view of an embodiment of an optical pick-up device of an optical disc player in accordance with the present invention.
Figure 4:
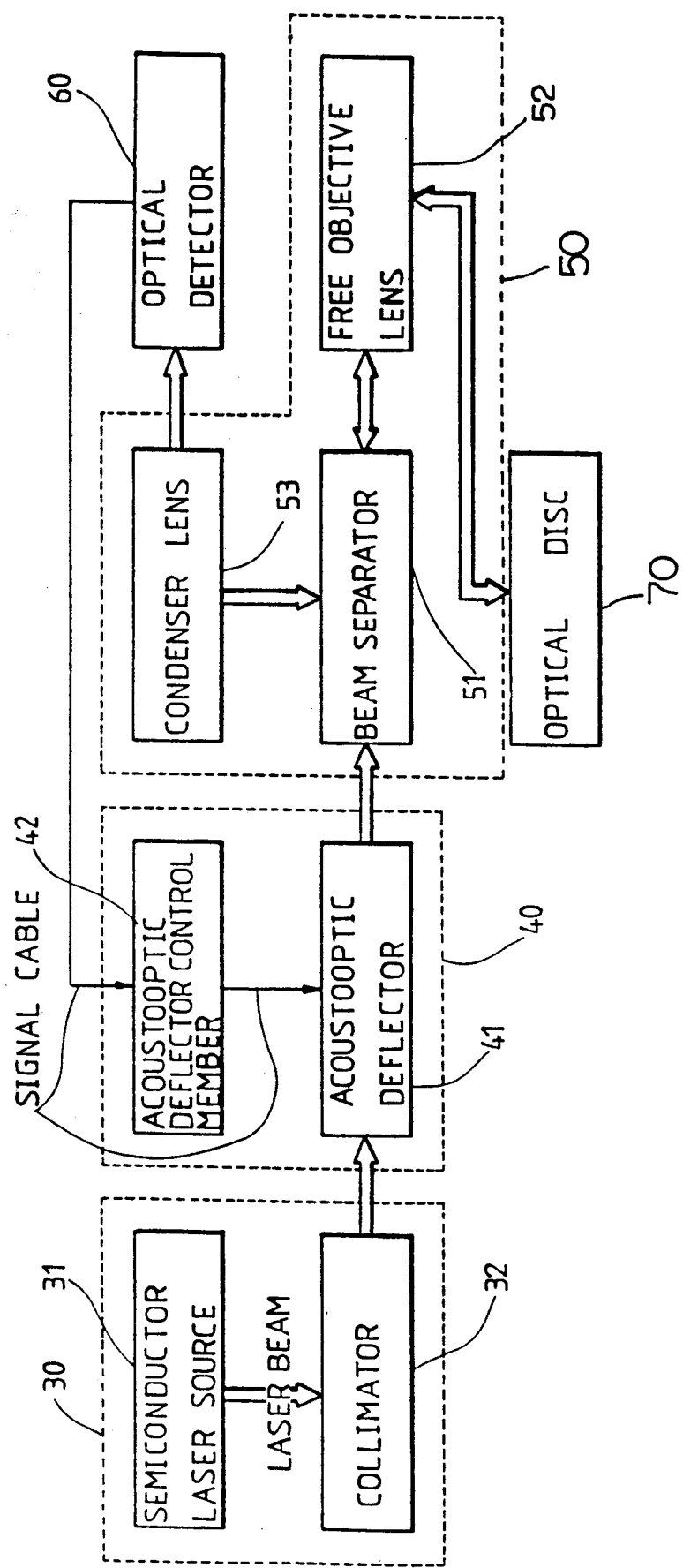
FIG. 4 is a block diagram showing a construction of the optical pick-up device of FIG. 3 and showing a relative operation between the components of the device.

Referring now to FIGS. 3 and 4 showing an embodiment of an optical pick-up device of an optical disc player according to the present invention, this device comprises a laser source part 30 which is disposed above a disc turntable (not shown), which is rotatably mounted on a deck of the optical disc player, so as to be spaced apart therefrom by a predetermined distance. This laser source part 30 generates the laser beam which is in turn scanned as a beam spot having a predetermined size. At a position below the laser source part 30, a beam deflecting part 40 is disposed. This part 40 receives the laser beam scanned by the laser source part 30 and deflects the received laser beam so as to cause this laser beam to be scanned to a desired access position of an optical disc 70 laid on the disc turntable. In addition, the present optical pick-up device has a beam scanning part 50 which, upon receiving the laser beam scanned by the beam deflecting part 40, makes the received beam become a minute beam spot which is in turn scanned to the optical disc 70 on the turntable. This beam scanning part 50 also separates the laser beam, which has been reflected by the optical disc 70, by reflecting the laser beam. Additionally, in the present optical pick-up device, an optical detector 60 is provided so as to receive the laser beam which has been reflected by the optical disc 70, separated and reflected by the beam scanning part 50. Upon receiving such a laser beam, the optical detector 60 detects the laser beam and outputs electric signals corresponding to the laser beam.

Hereinafter, the aforementioned parts of the optical pick-up device is described in detail.

First, the laser source part 30 comprises a semiconductor laser source 31 which is disposed above the disc turntable as spaced apart therefrom by a predetermined distance. This laser source 31 radiates the laser beam which is scanned to a desired access position of the optical disc 70. Arranged under the laser source 31 is a collimator 32 for collimating the laser beam radiated from the laser source 31 in order to become the laser beam spot having a predetermined size. This laser beam spot is in turn scanned to the beam deflecting part 40.

In order to constitute the beam deflecting part 40, an acoustooptic deflector 41 and an acoustooptic deflector control member 42 are provided as connected to each other. Here, the acoustooptic deflector 41 is arranged below the laser source part 30 and adapted to variable deflect the laser beam from the laser source part 30 in accordance with the change of the ultrasonic frequency thereof. The acoustooptic deflector control member 42 is disposed at a side of the acoustooptic deflector 41 as electrically connected thereto by means of a signal cable. This control member 42 is also applied with a feedback signal, corresponding to the desired access position of the optical disc 70, outputted from the optical detector 60 and controls the ultrasonic frequency of the acoustooptic deflector 41 in response to the inputted feedback signal. In this regard, this control member 42 causes the laser beam to be accurately scanned to the desired position of the optical disc 70 which is intended to be accessed by the pick-up device.

On the other hand, the beam scanning part 50 includes a free objective lens 52 which is disposed between the beam deflecting part 40 and the optical disc 70 so as to make the laser beam scanned by the beam deflecting part 40 become a minute beam spot which is focused on the desired access position of the optical disc 70. This objective lens 52 also condenses the retrace laser beam reflected by the optical disc 70. Between the free objective lens 52 and the beam deflecting part 40, a beam separator 51 is disposed. This beam separator 51 transmits the laser beam, which has been deflected by the beam deflecting part 40, in order to cause the laser beam to be received by the free objective lens 52 but reflects the retrace laser beam, which has been reflected by the optical disc 70 and retraced through the free objective lens 52, at a predetermined angle in order to separate the retrace laser beam. In addition, the beam scanning part 50 is also provided with a condenser lens 53 for condensing the retrace laser beam, which has been reflected by the beam separator 51, and for causing the condensed laser beam to be received by the optical detector 60.

Figure 5A:
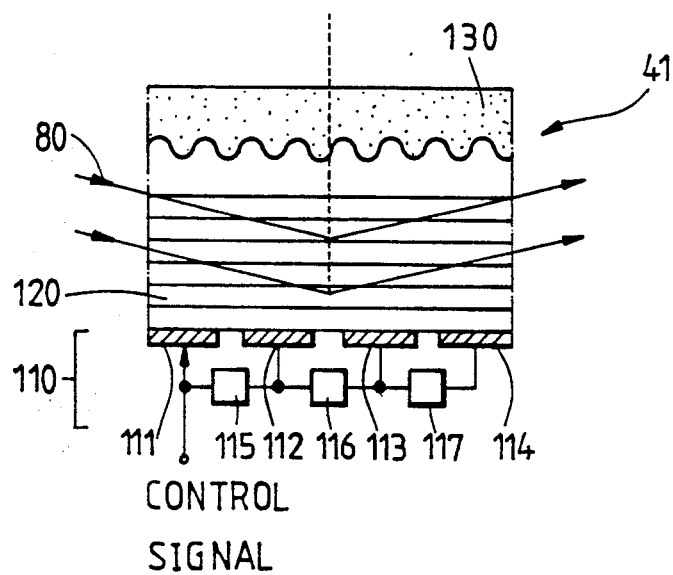
Figure 5B:
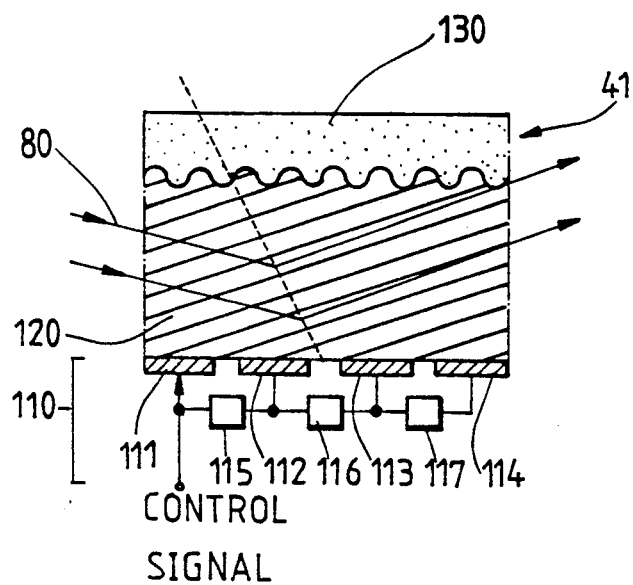

On the other hand, the acoustooptic deflector 41, which is most important inventive part of this invention, is such constructed that an ultrasonic generator 110 is closely disposed on the under surface of an acoustooptic material 120 as shown in FIGS. 5A and 5B. This acoustooptic material 120 is deformed by difference of the ultrasonic frequency and, in this respect, periodically varies the refractive index of light. The ultrasonic generator 110 changes the ultrasonic frequency under the control of the acoustooptic deflector control member 42 and scans the generated ultrasonic wave to the acoustooptic material 120. In order to absorb the ultrasonic wave transmitting the acoustooptic material 120, a sound absorber layer 130 is closely provided on the acoustooptic material 120.

As shown in FIGS. 5A and 5B showing an embodiment of the acoustooptic deflector 41, this embodiment has the ultrasonic generator 110 comprising a plurality of ultrasonic transducers 111 to 114 for generating the ultrasonic wave of a frequency under the control of the acoustooptic deflector control member 42 and scanning the generated ultrasonic wave to the acoustooptic material 120. In addition, between each two adjacent ultrasonic transducers, a phase difference control circuit 115, 116, 117 is connected to the corresponding transducers so as to control the corresponding ultrasonic transducers 111 to 114 to generate ultrasonic waves having staged phase differences. This causes the ultrasonic waves, having both the same frequency and the staged phase differences, to be scanned from the ultrasonic transducers 111 to 114 to the acoustooptic material 120. In this regard, the laser beam can be deflected at various deflection angles in stages as will be described below. In this case, it is preferred to provide even numbered, for example, four, ultrasonic transducers 111 to 114 for the acoustooptic deflector 41 such that the transducers 111 to 114 are arranged so as to be symmetrical with respect to the center of the acoustooptic material 120.

Of course, besides the primary embodiment of the acoustooptic deflector 41 having the ultrasonic generator 110 comprising the plurality of ultrasonic transducers 111 to 114 as shown in FIGS. 5A and 5B, the pick-up device of this embodiment may be provided with second alternate embodiment of an acoustooptic deflector having an ultrasonic generator which comprises one ultrasonic transducer which is abutted to the under surface of the acoustooptic material 120. As will be noted in the following description, the operational effect of the present pick-up device will be described with reference to the device having this second alternate embodiment of the acoustooptic deflector.

After loading the optical disc 70 on the disc turntable which is rotatably mounted on the deck of the optical disc player, the pick-up device starts its operation for accessing the optical disc 70. At this time, the laser beam is generated by the laser source part 30 and received by the beam deflecting part 40.

At the laser source part 30, the semiconductor laser source 31 generates the laser beam which is in turn collimated by the collimator 32. It is required to appropriately adjust the intervals between the semiconductor laser source 31, the collimator 32 and the acoustooptic deflector 41 of the beam deflecting part 40 so as to cause the collimated laser beam to be received as a beam spot having a predetermined size by the acoustooptic deflector 41.

At the acoustooptic deflector 41 of the beam deflecting part 40, the acoustooptic material 120 deflects the laser beam upon receiving the ultrasonic wave which has been generated and scanned by the ultrasonic generator 110. In this case, the deflection angle of the laser beam is influenced by the orientation of the acoustooptic material 120 corresponding to the ultrasonic frequency. Thereafter, if the ultrasonic frequency is changed, the acoustooptic material 120 is deformed and this causes the deflection angle of the laser beam to be changed in accordance with the deformed acoustooptic material 120.

That is, as the acoustooptic material 120 is deformed due to the change of the ultrasonic frequency, there occurs an acoustooptic effect wherein the refractive index of light is periodically changed and this causes the acoustooptic material 120 to function as a phase lattice for diffracting the light. Here, the ultrasonic wave, which has been generated by the ultrasonic generator 110 and transmitted through the acoustooptic material 120, is absorbed by the sound absorber layer 130 on the material 120, thereby efficiently preventing from being leaked to the outside.

Accordingly, the laser beam 80, which has been generated by the laser source part 30 and received by the acoustooptic deflector 41, is deflected by the deflector 41 as it is adjusted in its deflection angle in accordance with the frequency of the ultrasonic wave of the ultrasonic generator 110. Thus, it is possible to change the deflection angle of the laser beam at the acoustooptic deflector 41 in proportion to the change of the frequency of the ultrasonic wave and this causes the tracking for a desired access position in the radial direction of the optical disc 70 to be easily and accurately carried out.

The laser beam, which has been deflected to a desired direction by the acoustooptic deflector 41, is then received by the beam scanning part 50 in order to be scanned to the optical disc 70. In this beam scanning part 50, the free objective lens 52 focuses the laser beam in the shape of a minute beam spot on the optical disc 70.

As the laser beam reaches the optical disc 70, it is reflected by the disc 70 in order to be condensed by the free objective lens 52. Upon being transmitted through the objective lens 52, the retrace laser beam becomes a parallel beam which is in turn received by the under surface of the beam separator 51. The laser beam received by the under surface of the beam separator 51 is then reflected thereby at a predetermined angle in order to be condensed by the condenser lens 52 wherein the condensed laser beam is permitted to be received by the optical detector 60. Upon receiving the laser beam, this optical detector 60 detects the laser beam and outputs an electrical signal which is in turn received by a signal processing circuit (not shown). This signal processing circuit processes the electrical signal in order to play back the data recorded on the optical disc 70. In this case, an electric signal containing the information for the access position of the optical disc 70 feeds back to the acoustooptic deflector control member 42 at the same time. Thus, this member 42 controls the acoustooptic deflector 41 in response to the feedback signal corresponding to the access position of the optical disc 70, thereby causing the frequency of the ultrasonic wave of the deflector 41 to be controlled so as to permit the laser beam to be precisely scanned to the desired access position of the optical disc 70.

As a result, it is noted that the frequency of the ultrasonic wave of the acoustooptic deflector 41 is changed in accordance with the detect signal of the laser beam reflected by the optical disc 70. The deflection angle of the laser beam can be thus changed and this makes the laser beam be scanned to the desired position of the optical disc 70. In result, it is possible to accomplish the orbit tracking operation of the optical pick-up device by no addition of mechanical movement but by deflection of the laser beam.

On the other hand, when the optical pick-up device is provided with the primary alternate embodiment of the acoustooptic deflector 41 having the plurality of the ultrasonic transducers 111 to 114 and the phase difference control circuits 115, 116, 117 connected between each two adjacent ultrasonic transducers as shown in FIGS. 5A and 5B, the deflection of the laser beam by the acoustooptic material 41 will be carried out as follows.

First, when all of the ultrasonic transducers 111 to 114 generate an ultrasonic wave having the same predetermined frequency f1, respectively, and the phase differences between the two adjacent ultrasonic transducers 111 and 112, 112 and 113, 113 and 114 are respectively controlled by the phase difference control circuits 115 to 117 so as to be zero, the acoustooptic material 120 is horizontally arranged as shown in FIG. 5A, thereby having a horizontal lattice arrangement.

Thereafter, the ultrasonic transducers 111 to 114 generate an ultrasonic wave having a frequency f2 which is larger than the predetermined frequency f1, respectively. At the same time, the phase difference control circuits 115 to 117 control the phase differences between the two adjacent ultrasonic transducers 111 and 112, 112 and 113, 113 and 114 so as to make these phase differences have staged differences. In result, the acoustooptic material 120 is arranged so as to be inclined at a predetermined inclination angle with respect to the horizontal line as shown in FIG. 5A, thereby having an inclined lattice arrangement.

When the lattice arrangement of the acoustooptic material 120 is changed from the horizontal arrangement as depicted in FIG. 5A to the inclined arrangement as depicted in FIG. 5B, the deflection angle of the laser beam is increased as represented in FIG. 5B.

As described above, when the ultrasonic generator 110 comprises the plurality of ultrasonic transducers 111 to 114 and the plurality of phase difference control circuits 115, 116, 117 each connected between each two adjacent ultrasonic transducers, the generator 110 is controlled in its ultrasonic frequency and the phase differences between the ultrasonic transducers 111 to 114, thereby generating the ultrasonic waves having the same frequency and having the staged phase differences. Thus in this case, the laser beam can be deflected in the wider range of deflection angle and this improves the deflection efficiency of the laser beam of the acoustooptic deflector 41.

As aforementioned, the optical pick-up device of the present invention deflects the laser beam by means of the acoustooptic deflector so as to permit the laser beam to be scanned to a desired access position of optical disc. In this regard, the present optical pick-up device does not need a mechanical movement in carrying out the orbit tracking. In addition, this device does not require to be provided with the mechanical mechanism, which has been necessarily provided in the conventional pick-up device and generally comprises a pick-up head part guide rail, a step motor for driving the head part and a servo circuit for controlling the movement operation of the head part, thereby accomplishing the compactness of the construction. Furthermore in this device, the tracking operation is not carried out by the mechanical movement but carried out by deflecting the laser beam. In result, this pick-up device permits the tracking accuracy to be improved irrespective of the outside vibration, the outside shock and the like, moreover, this device substantially reduces the access time in comparison with that of the conventional device.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical pick-up device of an optical disc player comprising:
   a laser source part for generating a laser beam and for scanning said laser beam as a beam spot having a predetermined size, said laser source part being disposed above a disc turntable, said turntable being rotatably mounted on a deck of said optical disc player, so as to be spaced apart from the turntable by a predetermined distance;
   a beam deflecting part for receiving said laser beam scanned by the laser source part and for deflecting the laser beam so as to cause the laser beam to be scanned to a desired access position of an optical disc;
   a beam scanning part for causing the laser beam scanned by said beam deflecting part to become a concentrated beam spot which is in turn scanned over said optical disc on the turntable, said beam scanning part also functioning to separate a retrace laser beam reflected by the optical disc by reflecting said retrace laser beam; and
   an optical detector for receiving the retrace laser beam and for detecting the retrace laser beam so as to output electric signals corresponding to the detected retrace laser beam;
   said beam deflecting part comprising:
   an acoustooptic deflector for deflecting the laser beam of the laser source part in accordance with the change of the ultrasonic frequency thereof, said deflector being disposed below the laser source part; and
   an acoustooptic deflector control member for controlling the ultrasonic frequency of said acoustooptic deflector in response to an inputted feedback signal, said feedback signal corresponding to the desired access position of the optical disc and being outputted from said optical detector, in order to cause the laser beam to be disposed on the desired access position of the optical disc which is intended to be accessed, said control member being disposed at a side of the acoustooptic deflector and electrically connected thereto by means of a signal cable.

2. An optical pick-up device according to claim 1, wherein said laser source part comprises:
   a semiconductor laser source for radiating the laser beam toward the upper surface of the optical disc; and
   a collimator for collimating the laser beam radiated from the laser source in order to cause the laser beam to become the laser beam spot having the predetermined size which is in turn scanned to said beam deflecting part.

3. An optical pick-up device according to claim 1, wherein said acoustooptic deflector comprises:
   an acoustooptic material being capable of being deformed by means of the ultrasonic frequency so as to cause the refractive index of light thereof to be periodically varied;
   an ultrasonic generator for changing the ultrasonic frequency under the control of said acoustooptic deflector control member and for scanning the generated ultrasonic wave to a acoustooptic material, said ultrasonic generator being closely disposed on the under surface of said acoustooptic material; and
   a sound absorber layer for absorbing the ultrasonic wave transmitting an acoustooptic material, said sound absorber layer being closely provided on the acoustooptic material.

4. An optical pick-up device according to claim 3, wherein said ultrasonic generator comprises:
   a plurality of ultrasonic transducers for generating the ultrasonic wave under the control of the acoustooptic deflector control member and for scanning the generated ultrasonic wave to the acoustooptic material; and
   a plurality of phase difference control circuits for controlling said ultrasonic transducers so as to cause the ultrasonic frequencies of the ultrasonic transducers to have staged phase differences.

5. An optical pick-up device according to claim 1, wherein said beam scanning part comprises:
   a free objective lens for causing the laser beam scanned by said beam deflecting part to become a concentrated beam spot, which is in turn focused on the desired access position of the optical disc, and for condensing the retrace laser beam reflected by the optical disc, said free objective lens being disposed between said beam deflecting part and said optical disc;
   a beam separator for transmitting the laser beam, which has been deflected by the beam deflecting part, in order to cause the laser beam to be received by said free objective lens and for reflecting the retrace laser beam, which has been reflected by the optical disc and retraced through the free objective lens, at a predetermined angle in order to separate said retrace laser beam, said beam separator being disposed between the free objective lens and the beam deflecting part; and
   a condenser lens for condensing the retrace laser beam, which has been reflected by the beam separator, and for causing the retrace laser beam to be received by the optical detector.

* * * * *